US009873136B2

(12) United States Patent
Shim et al.

(10) Patent No.: US 9,873,136 B2
(45) Date of Patent: Jan. 23, 2018

(54) ULTRASONIC TRANSDUCER AND METHOD OF MANUFACTURING THE SAME

(71) Applicant: SAMSUNG ELECTRONICS CO., LTD., Suwon-si (KR)

(72) Inventors: Dongsik Shim, Hwaseong-si (KR); Seogwoo Hong, Yongin-si (KR); Seokwhan Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 420 days.

(21) Appl. No.: 14/701,580

(22) Filed: May 1, 2015

(65) Prior Publication Data

US 2016/0020709 A1 Jan. 21, 2016

(30) Foreign Application Priority Data

Jul. 21, 2014 (KR) ........................ 10-2014-0092162

(51) Int. Cl.

| | |
|---|---|
| ***H02N 11/00*** | (2006.01) |
| ***H02N 1/00*** | (2006.01) |
| ***H02N 2/00*** | (2006.01) |
| ***B06B 1/02*** | (2006.01) |

(52) U.S. Cl.

CPC .................................. *B06B 1/0292* (2013.01)

(58) Field of Classification Search

CPC .................................... H02N 1/00; B06B 1/02

USPC .......................... 310/300, 309, 365; 367/181

See application file for complete search history.

(56) References Cited

U.S. PATENT DOCUMENTS

| | | | | |
|---|---|---|---|---|
| 6,958,255 B2 | | 10/2005 | Khuri-Yakub et al. | |
| 8,299,550 B2 | * | 10/2012 | Zaitsu | B06B 1/0292 257/416 |
| 8,324,006 B1 | | 12/2012 | Adler et al. | |
| 8,402,831 B2 | | 3/2013 | Kupnik et al. | |
| 8,687,466 B2 | | 4/2014 | Kim | |
| 2008/0259725 A1 | * | 10/2008 | Bayram | B06B 1/0292 367/7 |
| 2010/0123366 A1 | * | 5/2010 | Chang | B06B 1/0292 310/300 |
| 2010/0254222 A1 | * | 10/2010 | Huang | B06B 1/0292 367/181 |
| 2011/0198966 A1 | * | 8/2011 | Fujii | B06B 1/0292 310/300 |
| 2012/0256518 A1 | * | 10/2012 | Torashima | B06B 1/0292 310/300 |
| 2013/0049526 A1 | * | 2/2013 | Chung | B32B 37/14 310/300 |
| 2013/0263669 A1 | * | 10/2013 | Nakanishi | G01H 9/00 73/655 |
| 2013/0270967 A1 | * | 10/2013 | Dausch | B06B 1/0607 310/365 |

* cited by examiner

*Primary Examiner* — Jose Gonzalez Quinones
(74) *Attorney, Agent, or Firm* — Sughrue Mion, PLLC

(57) ABSTRACT

An ultrasonic transducer and a method of manufacturing the same are provided. The ultrasonic transducer includes a substrate, a first insulation layer, and a first thin film layer; a plurality of support members formed on the first thin film layer; a second thin film layer supported by the plurality of support members; a cavity between the first thin film layer and the second thin film layer; and a common ground electrode on the second thin film layer.

20 Claims, 9 Drawing Sheets

ULTRASONIC TRANSDUCER AND METHOD OF MANUFACTURING THE SAME

CROSS-REFERENCE TO RELATED APPLICATION

This application claims priority from Korean Patent Application No. 10-2014-0092162, filed on Jul. 21, 2014 in the Korean Intellectual Property Office, the disclosure of which is incorporated herein in its entirety by reference.

BACKGROUND

1. Field

Apparatuses and methods consistent with exemplary embodiments relate to an ultrasonic transducer and a method of manufacturing the same.

2. Description of the Related Art

Ultrasonic transducers (e.g., micromachined ultrasonic transducers (MUTs)) convert an electric signal to an ultrasonic signal and vice versa. Ultrasonic transducers may be used, for example, in medical image diagnosis apparatuses, and thus may non-invasively obtain a picture or an image of tissue or an organ of a body. Ultrasonic transducers may be classified into piezoelectric micromachined ultrasonic transducers (pMUTs), capacitive micromachined ultrasonic transducers (cMUTs), and magnetic micromachined ultrasonic transducers (mMUTs), according to the signal converting method. From among these ultrasonic transducers, cMUTs are widely used.

cMUTs transmit and receive ultrasonic waves using a displacement variation of hundreds or thousands of oscillating membranes microprocessed on a silicon wafer. cMUTs may include a silicon wafer that is used in a general semiconductor process, a thin film disposed on the silicon wafer, and a cavity formed between the thin film and the silicon wafer. The silicon wafer, the thin film, and the cavity may form a capacitor. Once alternating current (AC) flows through the capacitor, the thin film begins to oscillate, thereby generating ultrasonic waves. Since cMUTs may transmit and receive ultrasonic waves without a couplant, such as water or oil, due to the thin film, it is easy to use the CMUTs.

SUMMARY

Exemplary embodiments address at least the above problems and/or disadvantages and other disadvantages not described above. Also, the exemplary embodiments are not required to overcome the disadvantages described above, and may not overcome any of the problems described above.

Provided are ultrasonic transducers including a ground electrode pad on an outside surface thereof.

Provided are methods of simply manufacturing ultrasonic transducers including a ground electrode pad on an outside surface thereof.

According to an aspect of an exemplary embodiment, there is provided an ultrasonic transducer including a substrate; a first insulation layer formed on the substrate; a first thin film layer provided on the first insulation layer and split into electrically independent elements by at least one insulation unit included in the first thin film layer; a plurality of support members provided on the first thin film layer; a second thin film layer supported by the plurality of support members; a cavity provided between the first thin film layer and the second thin film layer; at least one signal electrode pad included in each of the electrically independent elements and formed on the first thin film layer; and a common ground electrode on the second thin film layer.

The substrate may include silicon, and the first thin film layer may include silicon.

The substrate, the first insulation layer, and the first thin film layer may constitute a silicon-on-insulator (SOI) wafer.

The first thin film layer may be a thin film silicon layer.

The first thin film layer may have a thickness in the range of about 0 to about 10 μm.

The first thin film layer may be formed on the first insulation layer and contacts the first insulation layer.

The ultrasonic transducer may further include a second insulation layer formed on the first thin film layer.

A groove may be formed in a portion of the second insulation layer that is adjacent to one of the plurality of support members.

The ultrasonic transducer may further include a third insulation layer formed on a surface of the first thin film layer that faces the cavity.

The insulation unit may extend from the first thin film layer to a lower surface of the second thin film layer.

The electrically independent elements may be arranged one-dimensionally.

According to another aspect of an exemplary embodiment, there is provided a method of manufacturing an ultrasonic transducer including: forming a first wafer comprising a first substrate, a first insulation layer, and a first thin film layer; forming a second insulation layer on the first thin film layer by deposition; forming a gap by etching the second insulation layer; forming an insulation unit by etching the second insulation layer and the first thin film layer; forming a second wafer comprising a second substrate, a third insulation layer, and a second thin film layer; changing the gap into a cavity by disposing the second thin film layer of the second wafer on the second insulation layer; removing the third insulation layer and the second substrate; and forming a common ground electrode on the second thin film layer.

The first substrate, the second substrate, the first thin film layer, and the second thin film layer may include silicon.

The first wafer and the second wafer may be SOI wafers.

The first wafer and the second wafer may be coupled to each other by silicon direct bonding.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
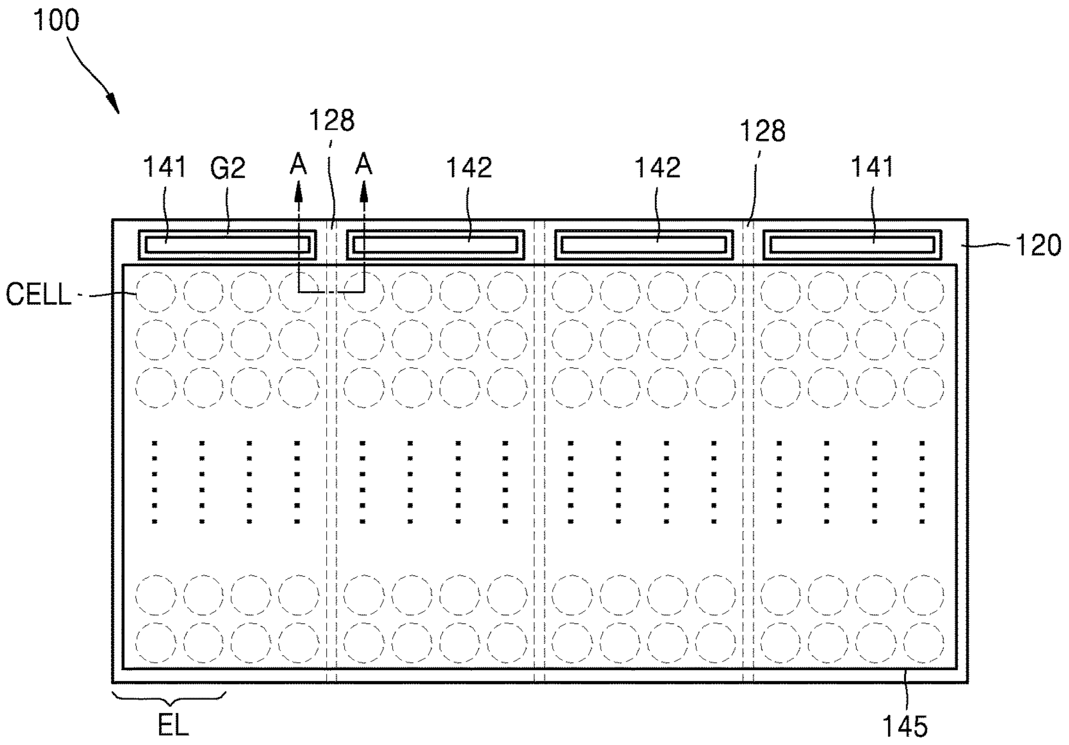
FIG. 1 is a schematic plan view of an ultrasonic transducer according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Hereinafter, ultrasonic transducers and methods of manufacturing the ultrasonic transducers, according to exemplary embodiments, will be described more fully with reference to the accompanying drawings. Like reference numerals in the drawings denote like elements, and, in the drawings, the sizes or thicknesses of elements may be exaggerated for convenience of explanation. In this regard, the present embodiments may have different forms and should not be construed as being limited to the descriptions set forth herein. When a layer is referred to as being "on" a substrate or another layer, the layer can be directly on the substrate or the other layer or intervening layers may be present thereon.

FIG. 1 is a schematic plan view of an ultrasonic transducer 100 according to an exemplary embodiment. The ultrasonic transducer 100 may include a plurality of elements ELs that are independently electrically driven. The plurality of elements ELs may be arranged, for example, in a one-dimensional manner. The plurality of elements ELs may include at least one cell CELL. Each cell CELL may be a minimal ultrasonic vibration unit that is defined by an insulation unit which will be described later. Although a cell CELL has a circular cross-section in FIG. 1, the shape of the cross-section of the cell CELL is not limited thereto, and the cell CELL may have any of various shapes of cross-section such as a rectangular cross-section and a polygonal cross-section.

Figure 2:
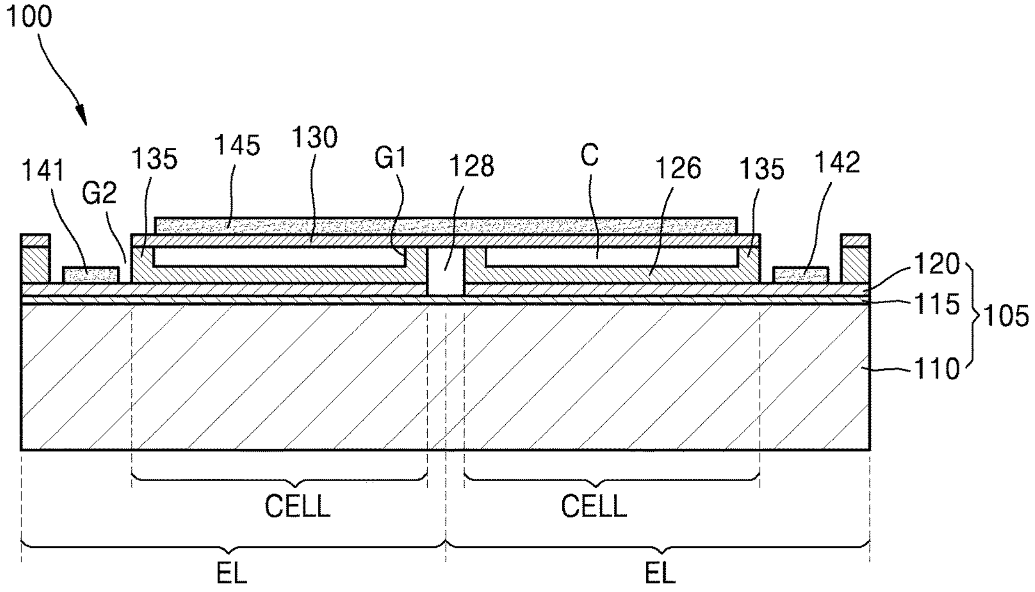
FIG. 2 is a schematic cross-sectional view of the ultrasonic transducer of FIG. 1.

FIG. 2 schematically illustrates the ultrasonic transducer 100 of FIG. 1. FIG. 2 is a view obtained by spreading a cross-section taken along line A-A of FIG. 1 for convenience of explanation. Since FIG. 1 is a schematic plan view for showing a relationship between the elements ELs and the cells CELLs and an electrode structure, FIGS. 1 and 2 may not exactly match with each other. As shown in FIG. 2, a first insulation layer 115 may be formed on a substrate 110, and a first thin film layer 120 may be formed on the first insulation layer 115. The first thin film layer 120 may directly contact, for example, the first insulation layer 115 without another layer interposed therebetween. However, embodiments are not limited thereto.

The substrate 110 may include, for example, silicon. The first thin film layer 120 may include a conductive material. For example, the first thin film layer 120 may include silicon. The first thin film layer 120 may include low resistance silicon and may have a low resistance by being doped with high concentration. Low resistance silicon may have, for example, resistivity of about 0.01 Ωcm or less. However, embodiments are not limited thereto, and the first thin film layer 120 may include any of various other conductive materials. The first thin film layer 120 may be used as an electrode.

The substrate 110, the first insulation layer 115, and the first thin film layer 120 may constitute a silicon-on-insulator (SOI) wafer. In this case, the first thin film layer 120 may be a silicon thin film layer. The first thin film layer 120 may have a thickness, for example, in the range from 0 μm to 10 μm. However, the thickness of the first thin film layer 120 is not limited thereto, and the first thin film layer 120 may have any thickness as long as an insulation unit (also referred to as an insulation gap) 128 can be easily formed by etching the first thin film layer 120.

The first insulation layer 115 may include, for example, oxide or nitride. For example, the first insulation layer 115 may be formed of silicon oxide. The first thin film layer 120 may include at least one insulation unit 128. The first thin film layer 120 may be split into the plurality of elements ELs by the insulation unit 128. The insulation unit 128 may be formed through the first thin film layer 120 and may electrically insulate the plurality of elements ELs from each other.

At least one support member 135 may be provided on the first thin film layer 120. The at least one support member 135 may be included in each of the plurality of elements ELs. The support member 135 may be connected as a single body in each of the plurality of elements ELs. Alternatively, a plurality of support members, including the support member 135, may be arranged to be spaced apart from each other in each of the plurality of elements ELs. A first gap G1 and a second gap G2 may be formed between the support member 135 and another support member adjacent to the support member 135.

A second thin film layer 130 may be provided on the support member 135 to cover the first gap G1. A cavity C may be included between the first thin film layer 120 and the second thin film layer 130. In other words, when the second thin film layer 130 is provided on the support member 135, the first gap G1 between the support member 135 and another adjacent support member may turn into the cavity C. The height of the cavity C may correspond to the thickness of the support member 135. The thickness of the support member 135 may be also described as a height of the support member 135.

At least one electrode pad may be included in the second gap G2 between two adjacent ones of the plurality of support members. For example, a first electrode pad 141 may be included in an element, and a second electrode pad 142 may be included in another element. The first and second electrode pads 141 and 124 may be signal electrode pads that apply driving signals to the elements ELs. At least one first or second electrode pad 141 or 142 may be included in each element EL. The first or second electrode pad 141 or 142 may be included at one end of each element EL. Although one first or second electrode pad 141 or 142 is included in each element EL in FIG. 1, embodiments are not limited thereto. A plurality of first or second electrode pads 141 or 142 may be included in each element EL.

Although the first and second electrode pads 141 and 142 are respectively included in the second gaps G2 in FIG. 2, this is only an example, and the first and second electrode pads 141 and 142 may be formed on the second thin film layer 130 having open lateral sides.

The first and second electrode pads 141 and 142 may be formed of a conductive material. For example, the first and second electrode pads 141 and 142 may be formed of metal, for example, gold (Au), copper (Cu), tin (Sn), silver (Ag), aluminum (Al), platinum (Pt), titanium (Ti), nickel (Ni), chromium (Cr), or a compound thereof.

The second thin film layer 130 may be formed of a conductive material. For example, the second thin film layer 130 may include silicon. The second thin film layer 130 may have a thickness, for example, in the range of 0 to 10 μm. However, embodiments are not limited thereto.

An electrode 145 may be provided on the second thin film layer 130. The electrode 145 may be a common ground electrode. The common ground electrode 145 may be used in common by all of the elements ELs.

A second insulation layer 126 may be further provided on a portion of the first thin film layer 120 that corresponds to each cell CELL. The second insulation layer 126 may prevent a short circuit between the first and second thin film layers 120 and 130. Since the cavity C has a small gap, when the second thin film layer 130 vibrates, it may contact the first thin film layer 120. At this time, the second insulation layer 126 may prevent an electrical short circuit between the first thin film layer 120 and the second thin film layer 130.

The second insulation layer 126 may be formed of the same material as that used to form the support member 135. The second insulation layer 126 and the support member 135 may be formed as a single body or may be formed as different bodies. The insulation unit 128 may extend from the first thin film layer 120 to the lower surface of the second thin film layer 130. The lower surface of the second thin film layer 130 may be a surface of the second thin film layer 130 that faces the first thin film layer 120.

An operation of the ultrasonic transducer 100 will now be described with reference to FIGS. 1 and 2.

When a direct current (DC) voltage is applied to the first thin film layer 120, which is a lower electrode, and the common ground electrode 145, which is an upper electrode, via the first and second electrode pads 141 and 142, the second thin film layer 130 may be positioned at a height where an electrostatic force between the first thin film layer 120 and the common ground electrode 145 is equaled by Earth's gravity force on the second thin film layer 130. In other words, the second thin film layer 130 stays where the downward pull of the gravity force is equaled by the upward pull of the electrostatic force. When an alternating current (AC) voltage is applied to the first thin film layer 120 and the common ground electrode 145, the second thin film layer 130 may vibrate due to a change in the electrostatic force between the first thin film layer 120 and the common ground electrode 145. Due to this vibration, an ultrasonic signal may be transmitted from the second thin film layer 130. A receiving operation of the ultrasonic transducer 100 will now be described. When a DC voltage is applied to the first thin film layer 120 and the common ground electrode 145 via the first and second electrode pads 141 and 142 to initialize the ultrasonic transducer 100, the second thin film layer 130 may be positioned at the height where the electrostatic force between the first thin film layer 120 and the common ground electrode 145 is equaled by the gravity force on the second thin film layer 130. In this state, when a physical signal, for example, an acoustic signal, is input from an external source to the first thin film layer 120, the electrostatic force between the first thin film layer 120 and the common ground electrode 145 may be changed. The ultrasonic transducer 100 may sense the changed electrostatic force and may receive the acoustic signal from the external source.

The ultrasonic transducer 100 uses the first thin film layer 120 as the lower electrode and includes the insulation unit 128 in the first thin film layer 120 in order to electrically insulate the elements ELs from each other. Thus, a process of forming the insulation unit 128 in the first thin film layer 120 may be simplified. In addition, since a signal voltage is applied to each element via the first thin film layer 120 and the common ground electrode 145 is formed on the second thin film layer 130, which is on a side of the ultrasonic transducer 100 that contacts a body, the ultrasonic transducer 100 may be used more stably for a patient.

Figure 3:
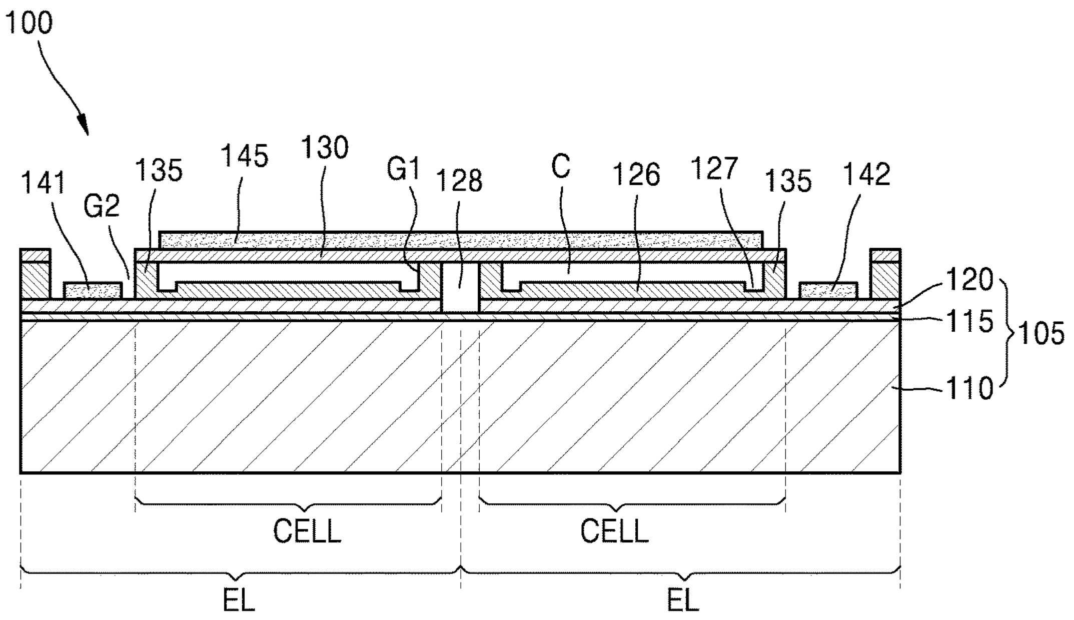
FIG. 3 illustrates a modification of the ultrasonic transducer of FIG. 2.

FIG. 3 illustrates a modification of the ultrasonic transducer 100 of FIG. 2.

The members indicated by the same reference numerals in FIGS. 2 and 3 have substantially the same function and operation, and thus, detailed descriptions thereof will be omitted. As shown in FIG. 3, a groove 127 may be included in the second insulation layer 126 existing in the cavity C of each cell CELL. The groove 127 may be provided between the second insulation layer 126 and the support member 135. When a portion of the ultrasonic transducer 100 that is created during a manufacturing process and may degrade its performance is removed, the groove 127 may be formed. The groove 127 will be described later in more detail.

Figure 4:
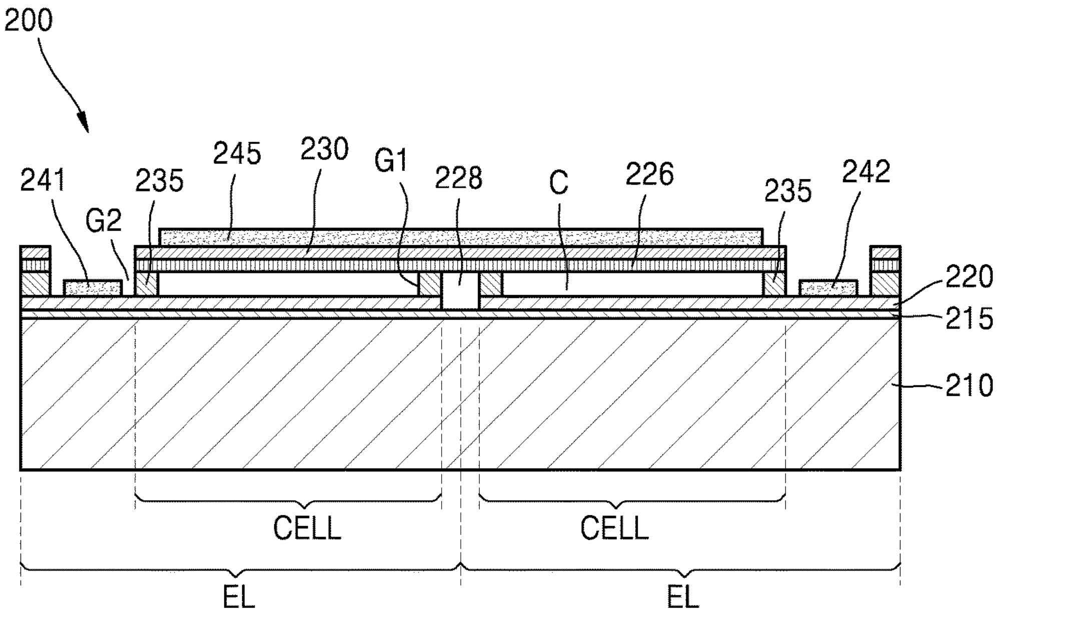
FIG. 4 is a schematic cross-sectional view of an ultrasonic transducer according to another exemplary embodiment.

FIG. 4 is a schematic cross-sectional view of an ultrasonic transducer 200 according to another embodiment.

As shown in FIG. 4, a first insulation layer 215 may be formed on a substrate 210, and a first thin film layer 220 may be formed on the first insulation layer 215. The first thin film layer 220 may directly contact, for example, the first insulation layer 215 without another layer interposed therebetween. However, embodiments are not limited thereto.

The substrate 210 may include, for example, silicon. The first thin film layer 220 may be formed of a conductive material. For example, the first thin film layer 220 may include silicon. The first thin film layer 220 may be formed of low resistance silicon and may have a low resistance by being doped with high concentration. Low resistance silicon may have, for example, resistivity of about 0.01 Ωcm or less. However, embodiments are not limited thereto, and the first thin film layer 120 may include any of various other conductive materials. The first thin film layer 220 may be used as an electrode.

The substrate 210, the first insulation layer 215, and the first thin film layer 220 may constitute an SOI wafer. In this case, the first thin film layer 220 may be a silicon thin film layer. The first thin film layer 220 may have a thickness, for example, in the range from 0 to 10 μm. However, the thickness of the first thin film layer 220 is not limited thereto, and the first thin film layer 220 may have any thickness as long as an insulation unit 228 can be easily formed by etching the first thin film layer 220.

The first insulation layer 215 may include, for example, oxide or nitride. For example, the first insulation layer 215 may be formed of silicon oxide. The first thin film layer 220 may include at least one insulation unit 228. The first thin film layer 220 may be split into the plurality of elements EL by the insulation unit 228. The insulation unit 228 may be formed through the first thin film layer 220 and may electrically insulate the plurality of elements EL from each other.

At least one support member 235 may be formed on the first thin film layer 220. The at least one support member 235 may be included in each of the plurality of elements EL. The support member 235 may be formed as a single body in each element EL. Alternatively, a plurality of support members, including the support member 235, may be arranged to be spaced apart from each other in each element EL. A first gap G1 and a second gap G2 may be formed between the support member 235 and another support member adjacent to the support member 235.

A second thin film layer 230 may be provided on the support member 235 to cover the first gap G1. A cavity C may be included between the first thin film layer 220 and the second thin film layer 230. In other words, when the second thin film layer 230 is formed on the support member 235, the first gap G1 between support members may turn into the cavity C. The height of the cavity C may be determined by the thickness of the support member 235.

At least one electrode pad may be included in the second gap G2 between support member 235 and another support member adjacent to the support member 235. For example, a first electrode pad 241 may be included in an element, and a second electrode pad 242 may be included in another element. The first and second electrode pads 241 and 224 may be signal electrode pads that apply driving signals to the elements EL. At least one first or second electrode pad 241 or 242 may be included in each element EL. The first or second electrode pad 241 or 242 may be included at one end of each element EL. Although one first or second electrode pad 241 or 242 is included in each element EL in FIG. 3, embodiments are not limited thereto. A plurality of first or second electrode pads 241 or 242 may be included in each element EL.

The first and second electrode pads 241 and 242 may include a conductive material. For example, the first and second electrode pads 241 and 242 may be formed of metal, for example, gold (Au), copper (Cu), tin (Sn), silver (Ag), aluminum (Al), platinum (Pt), titanium (Ti), nickel (Ni), chromium (Cr), or a compound thereof.

The second thin film layer 230 may include a conductive material. For example, the second thin film layer 230 may include silicon. The second thin film layer 230 may have a thickness, for example, in the range from 0 to 10 μm. However, embodiments are not limited thereto.

An electrode 245 may be formed on the second thin film layer 230. The electrode 245 may be a common ground electrode. The common ground electrode 245 may be used commonly by all of the elements EL.

A second insulation layer 226 may provided on a surface of the second thin film layer 230 within each cell CELL. The second insulation layer 226 may be provided on a surface of the second thin film layer 230 that faces the first thin film layer 220. The second insulation layer 226 may prevent a short circuit between the first and second thin film layers 220 and 230. Since the cavity C has a small gap, when the second thin film layer 230 vibrates, it may contact the first thin film layer 220. At this time, the second insulation layer 226 may prevent an electrical short circuit between the first thin film layer 220 and the second thin film layer 230.

The insulation unit 228 may extend from the first thin film layer 220 to a lower surface of the second thin film layer 230. The lower surface of the second thin film layer 230 may be a surface of the second thin film layer 230 that faces the first thin film layer 220.

A method of manufacturing an ultrasonic transducer according to an embodiment will now be described.

Figure 5:
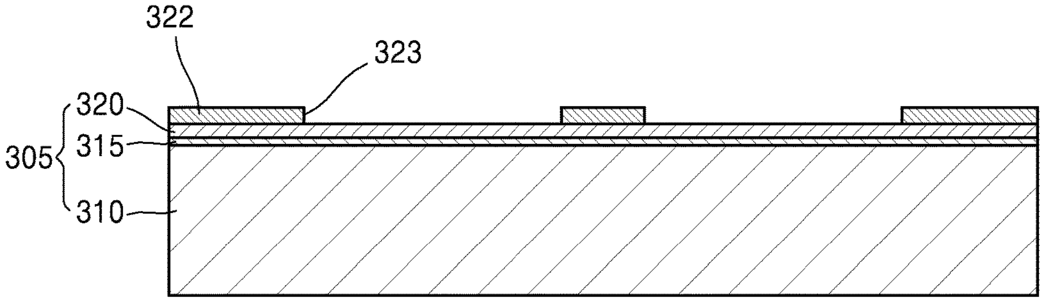
FIGS. 5-12 are cross-sectional views for illustrating a method of manufacturing an ultrasonic transducer, according to an exemplary embodiment.

As shown in FIG. 5, a first insulation layer 315 may be formed on a first substrate 310 by deposition, and a first thin film layer 320 may be formed on the first insulation layer 315 by deposition. The first substrate 310 and the first thin film layer 320 may include silicon. A first wafer 305 including the first substrate 310, the first insulation layer 315, and the first thin film layer 320 may be prepared. For example, the first substrate 310, the first insulation layer 315, and the first thin film layer 320 may constitute a first SOI wafer 305. The first thin film layer 320 may be formed of a conductive material. For example, the first thin film layer 320 may be formed of low resistance silicon and may have a low resistance by being doped with high concentration. Low resistance silicon may have, for example, resistivity of about 0.01 Ωcm or less. However, embodiments are not limited thereto, and the first thin film layer 320 may be formed of any of various other conductive materials. The first thin film layer 320 may have a thickness, for example, in the range from 0 to 10 μm.

Figure 6:
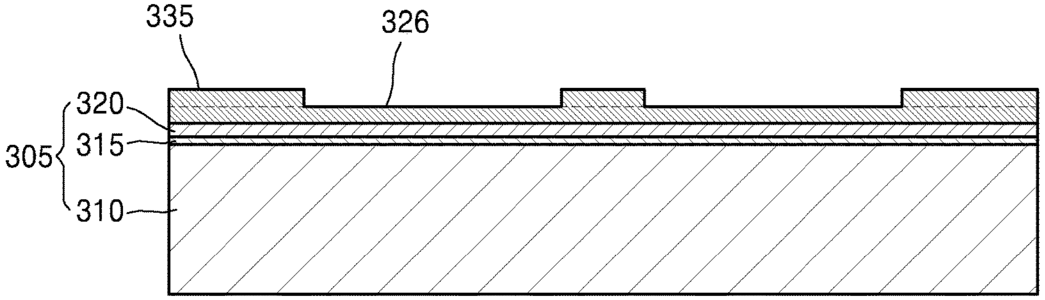

A second insulation layer 322 may be formed on the second thin film layer 320 by deposition. The second insulation layer 322 may be etched to form a first gap 323. The second insulation layer 322 may be etched to expose the first thin film layer 320. A portion remaining after etching the second insulation layer 322 may serve as a support member that supports a second thin film layer which will be described later. As shown in FIG. 6, a third insulation layer 326 may be formed on the etched second thin film layer 320 by deposition. The second and third insulation layers 322 and 326 may be a silicon oxide film or a silicon nitride film. The third insulation layer 326 may be stacked on the second insulation layer 322 to form a support member 335.

Figure 7:
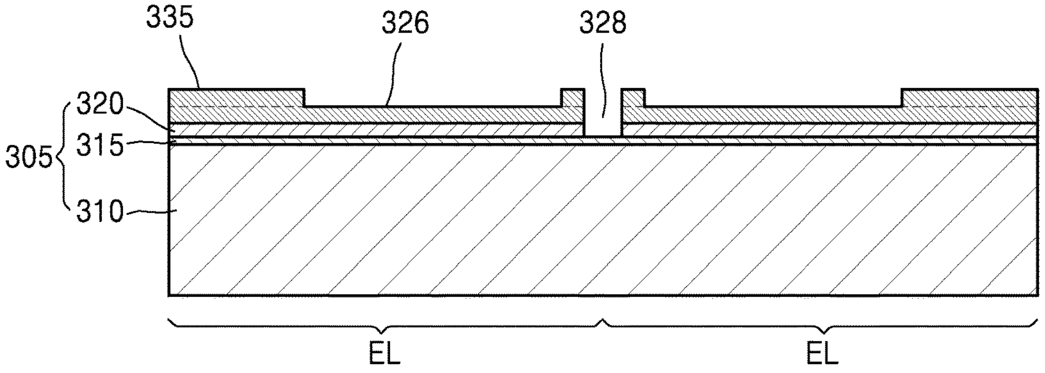

As shown in FIG. 7, the third insulation layer 326, the second insulation layer 322, and the first thin film layer 320 may be etched to form an insulation unit 328. The insulation unit 328 may define a plurality of elements ELs that are independently electrically driven. The plurality of elements ELs may be arranged, for example, in a one-dimensional structure. Since the thickness of the first thin film layer 320 is small, the insulation unit 328 may be easily manufactured.

Figure 8:
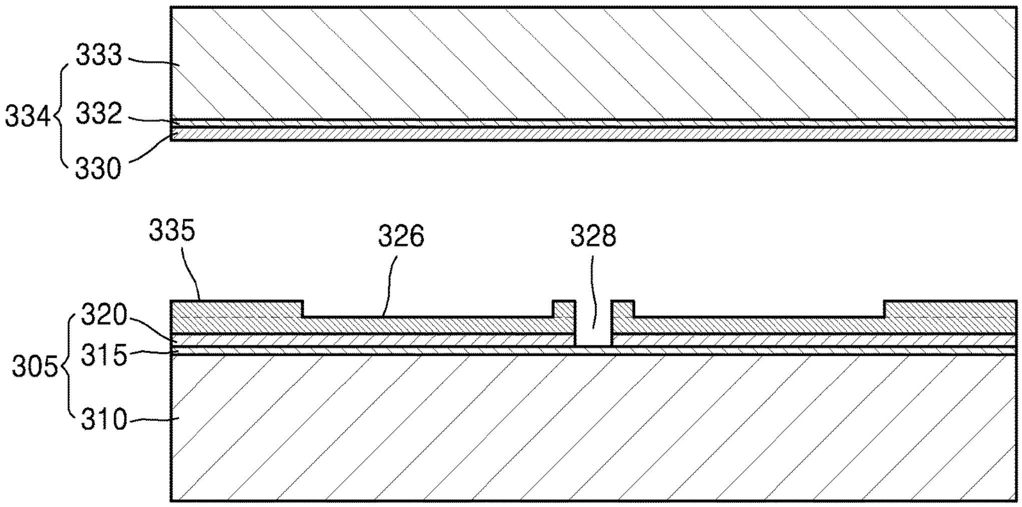

As shown in FIG. 8, a fourth insulation layer 332 may be formed on a second substrate 333 by deposition, and a second thin film layer 330 may be formed on the fourth insulation layer 332 by deposition. For example, a second wafer 334 including the second substrate 333, the fourth insulation layer 332, and the second thin film layer 330 may be prepared. For example, the first substrate 333, the fourth insulation layer 332, and the second thin film layer 330 may constitute a second SOI wafer 334.

The second wafer 334 may be bonded with the first wafer 305 on which the third insulation layer 326 is stacked. When the second wafer 334 is bonded with the first wafer 305, the second thin film layer 330 of the second wafer 334 may face the support member 335 and the third insulation layer 326, and then the bonding may be performed. The first wafer 305 and the second wafer 334 may bond together by, for example, silicon direct bonding. However, a bonding method is not limited thereto.

Figure 9:
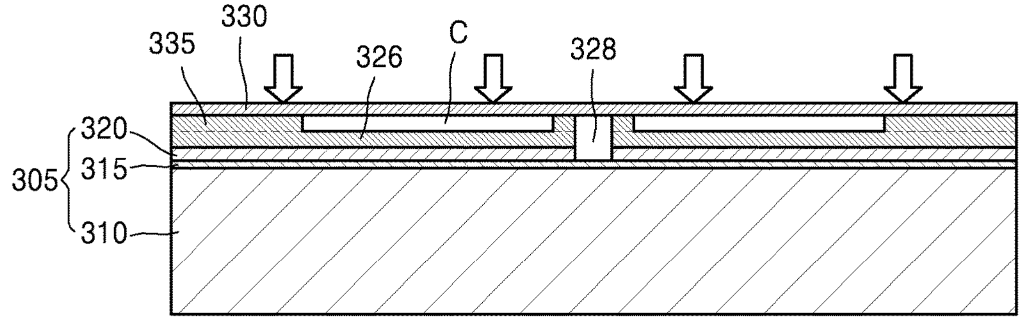
Figure 10:
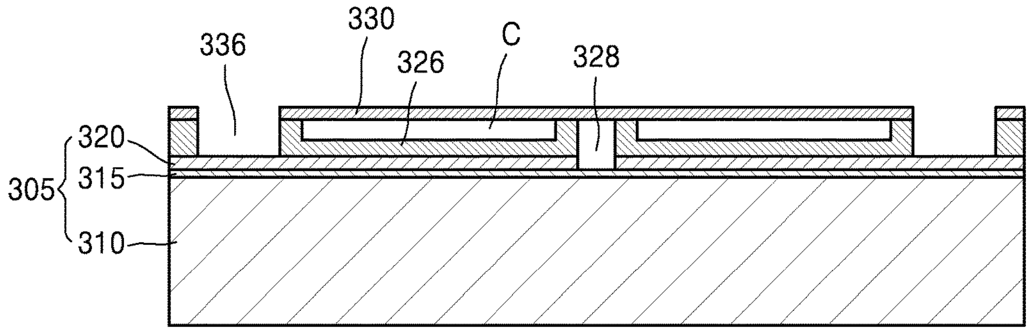
Figure 11:
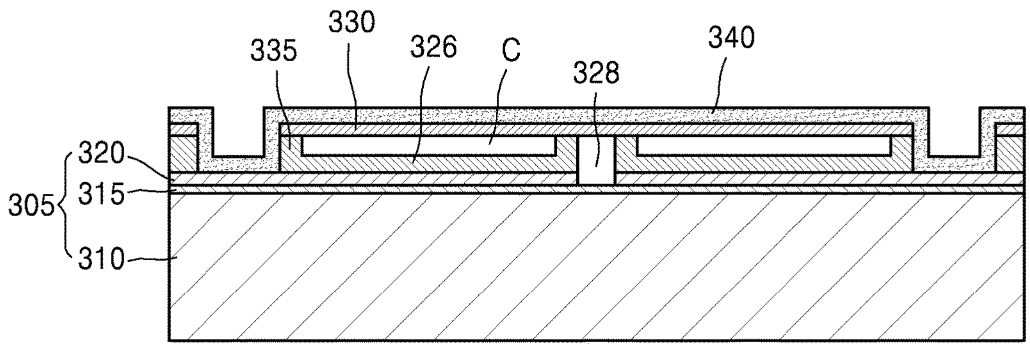
Figure 12:
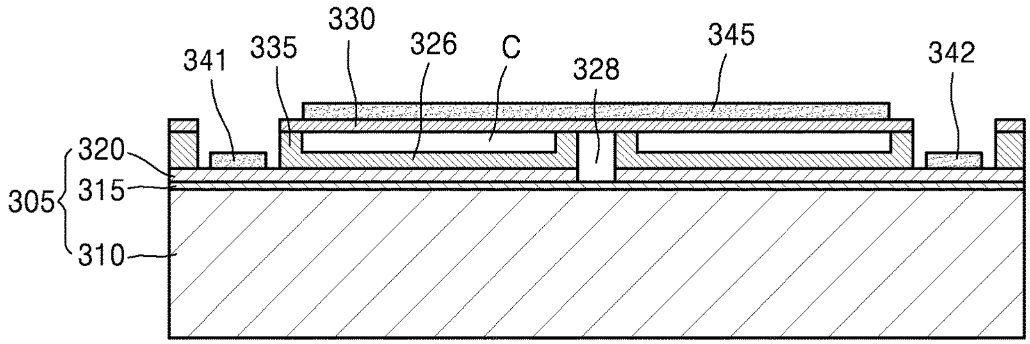

As shown in FIG. 9, the second substrate 333 and the fourth insulation layer 332 may be removed, and only the second thin film layer 330 may be left. A cavity C may be formed between the third insulation layer 326 and the second thin film layer 330. As shown in FIG. 10, the second thin film layer 330 and the support member 335 may be etched to form a second gap 336. Then, as illustrated in FIG. 11, an electrode layer 340 may be stacked on a resultant structure illustrated in FIG. 10. As shown in FIG. 12, the electrode layer 340 may be patterned to form an electrode pad on a portion of the first thin film layer 320 that is exposed via the second gap 336. For example, a first electrode pad 341 may be formed in an element EL, and a second electrode pad 342 may be formed in another element EL. The first and second electrode pads 341 and 342 may be signal electrode pads that apply driving signals to the elements. A common ground electrode 345 may be formed on the second thin film layer 340. The common ground electrode 345 may be used commonly by all of the elements. Since the common ground electrode 345 is formed on a top surface that contacts a body, the ultrasonic transducer may be safely used.

Moreover, according the ultrasonic transducer manufacturing method according to the present embodiment, since the first wafer 305 and the second wafer 334 may be directly bonded with each other, a manufacturing process may be simplified and manufacturing costs may be reduced.

Figure 13:
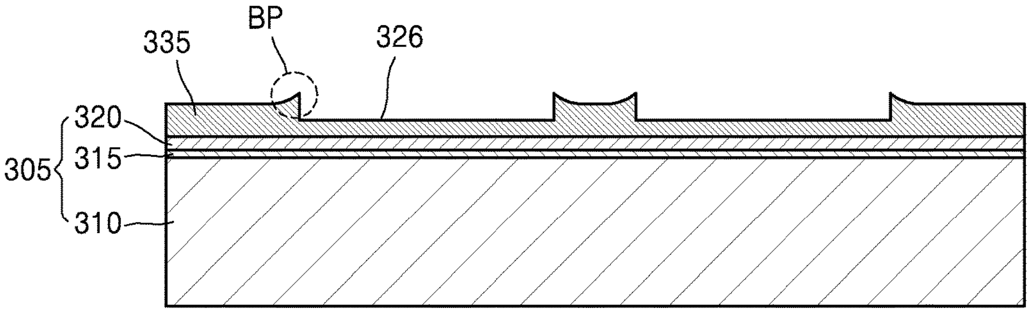
FIGS. 13-15 are cross-sectional views for illustrating operations that may be optionally performed in the method of FIGS. 5-12.
Figure 14:
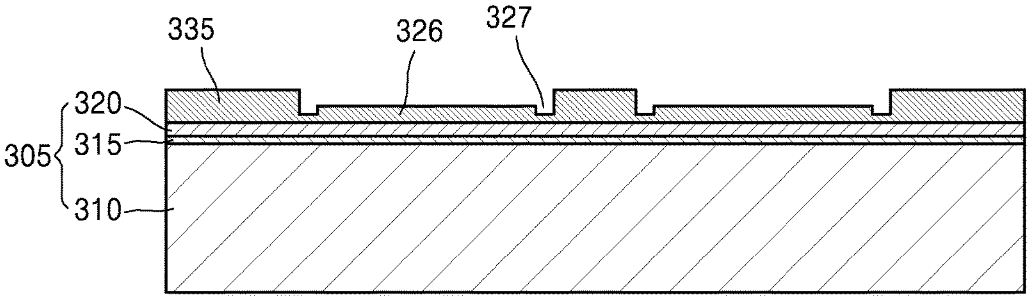
Figure 15:
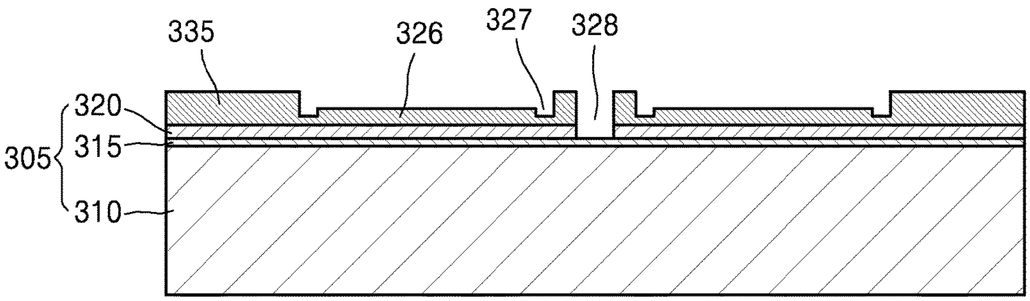

FIGS. 13-15 illustrate additional processes that are optional. As shown in FIG. 13 and FIGS. 5 and 6, while the third insulation layer 326 is being formed on the second insulation layer 322 by deposition, a protrusion BP may be created at an upper end of the first gap 323. Due to the creation of the protrusion BP, when the second wafer 305 is bonded onto the third insulation layer 326 (see FIG. 8), adhesion of the second thin film layer 330 of the second wafer 334 may be reduced. According to the sizes of cells CELLs within the elements EL, the reduction of the adhesion of the second thin film layer 330 to the support member 335 may adversely affect the performance of the ultrasonic transducer. Thus, an operation of removing the protrusion BP may be further included. As shown in FIG. 14, the protrusion BP of the support member 335 may be etched and removed. During etching of the protrusion BP, a portion of the second insulation layer 326 may be also etched, and thus a groove 327 may be formed.

As show in FIG. 15, to electrically insulate the elements from each other, the second insulation layer 322, the third insulation layer 326, and the first thin film layer 320 may be etched to form the insulation unit 328. Subsequent processes may be performed in the same manners as presented with respect to FIGS. 10-12.

By additionally performing the processes illustrated in FIGS. 13 and 14, a portion of the ultrasonic transducer that is created during a manufacturing process and may degrade its performance may be removed, thereby improving the performance of the ultrasonic transducer.

A method of manufacturing an ultrasonic transducer, according to an embodiment, will now be described with reference to FIGS. 16-22.

Figure 16:
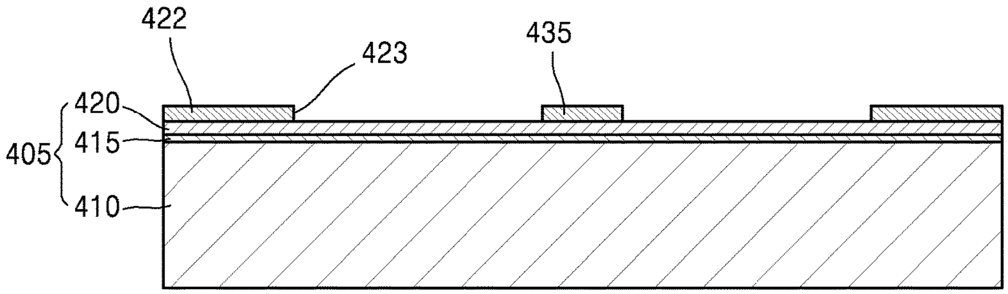
FIGS. 16-22 are cross-sectional views for illustrating a method of manufacturing an ultrasonic transducer, according to another exemplary embodiment.

As shown in FIG. 16, a first insulation layer 415 may be formed on a first substrate 410 by deposition, and a first thin film layer 420 may be formed on the first insulation layer 415 by deposition. The first substrate 410 and the first thin film layer 420 may include silicon. A first wafer 405 including the first substrate 410, the first insulation layer 415, and the first thin film layer 420 may be prepared. For example, the first substrate 410, the first insulation layer 415, and the first thin film layer 420 may constitute a first SOI wafer 405. The first thin film layer 420 may be formed of a conductive material. For example, the first thin film layer 420 may be formed of low resistance silicon and may have a low resistance by being doped with high concentration. Low resistance silicon may have, for example, resistivity of about 0.01 Ωcm or less. However, embodiments are not limited thereto, and the first thin film layer 420 may be formed of any of various other conductive materials. The first thin film layer 420 may have a thickness, for example, in the range from 0 to 10 μm.

Figure 17:
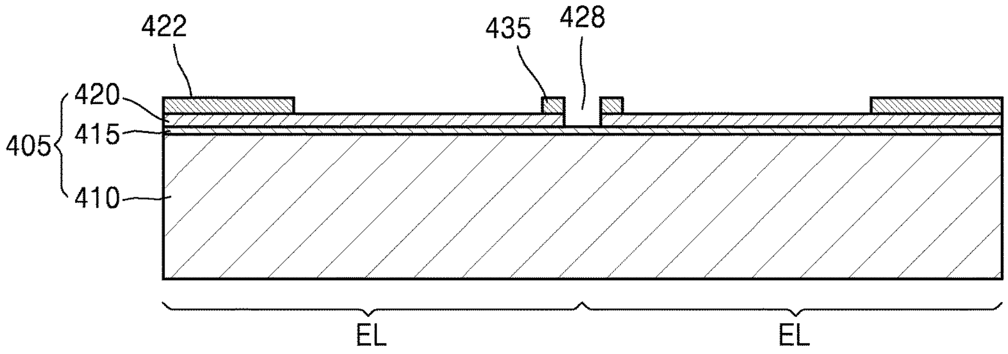

A second insulation layer 422 may be formed on the first thin film layer 420 by deposition. The second insulation layer 422 may be etched to form a first gap 423. The second insulation layer 422 may be etched to expose the first thin film layer 420. A portion remaining after etching the second insulation layer 422 may serve as a support member 435 that supports a second thin film layer 430 of FIG. 18. As shown in FIG. 17, the second insulation layer 422 and the first thin film layer 420 may be etched to form an insulation unit 428. The first insulation layer 415 may be exposed via the insulation unit 428.

The insulation unit 428 may define a plurality of elements ELs that are independently electrically driven. The plurality of elements ELs may be arranged, for example, in a one-dimensional structure. Since the thickness of the first thin film layer 420 is small, the insulation unit 428 may be easily manufactured.

Figure 18:
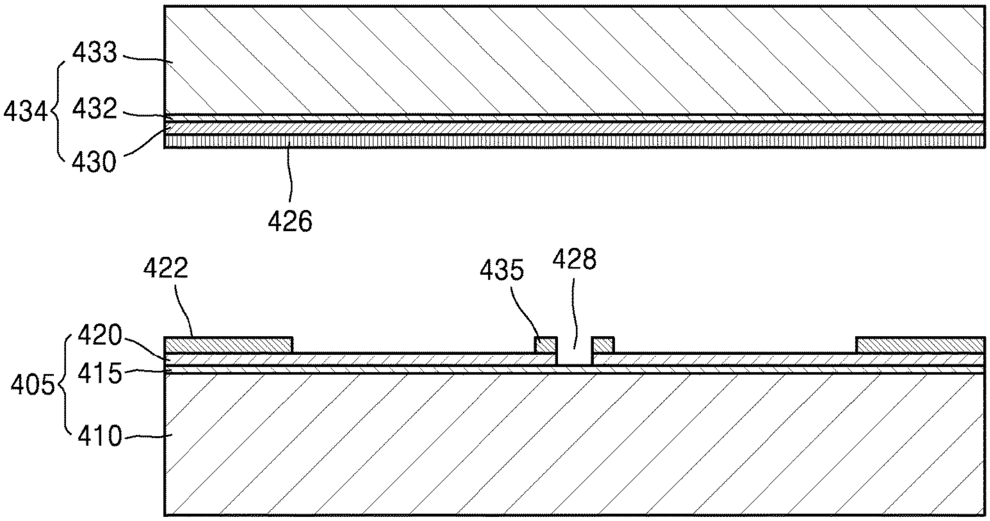

As shown in FIG. 18, a third insulation layer 432 may be formed on a second substrate 433 by deposition, and the second thin film layer 430 may be formed on the third insulation layer 432 by deposition. For example, a second wafer 434 including the second substrate 433, the third insulation layer 432, and the second thin film layer 430 may be prepared. For example, the first substrate 433, the third insulation layer 432, and the second thin film layer 430 may constitute a second SOI wafer 434.

A fourth insulation layer 426 may be formed on the second wafer 434 by deposition. The second wafer 434 on which the fourth insulation layer 426 is stacked may be bonded with the first wafer 405. When the second wafer 434 is bonded with the first wafer 405, the fourth thin film layer 426 of the second wafer 434 may face the second insulation layer 422, and then the bonding may be performed. The first wafer 405 and the second wafer 434 may bond together by, for example, silicon direct bonding. However, a bonding method is not limited thereto.

Figure 19:
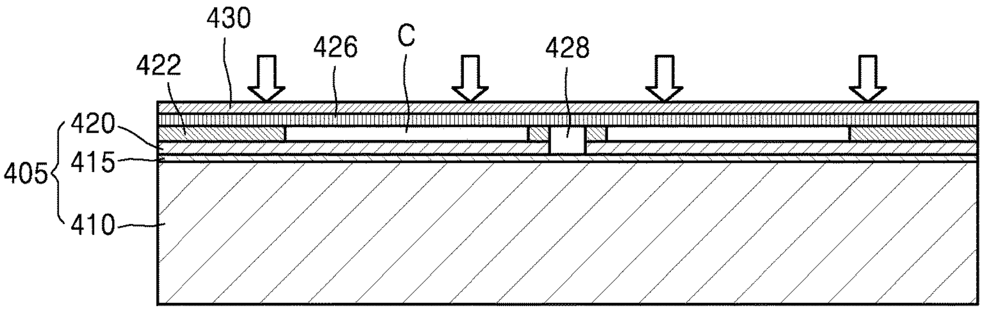
Figure 20:
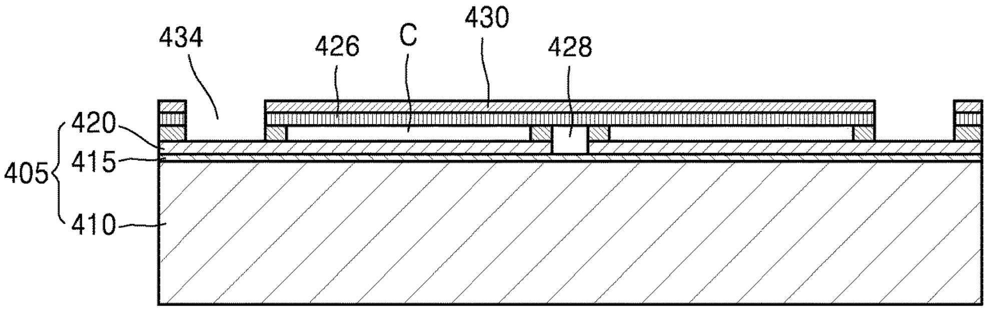
Figure 21:
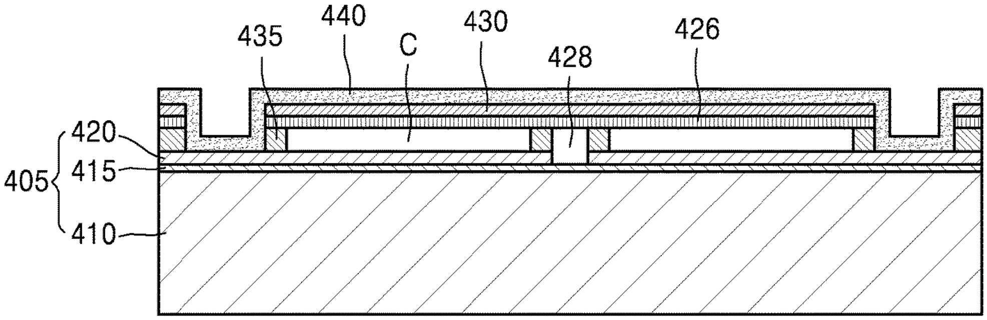
Figure 22:
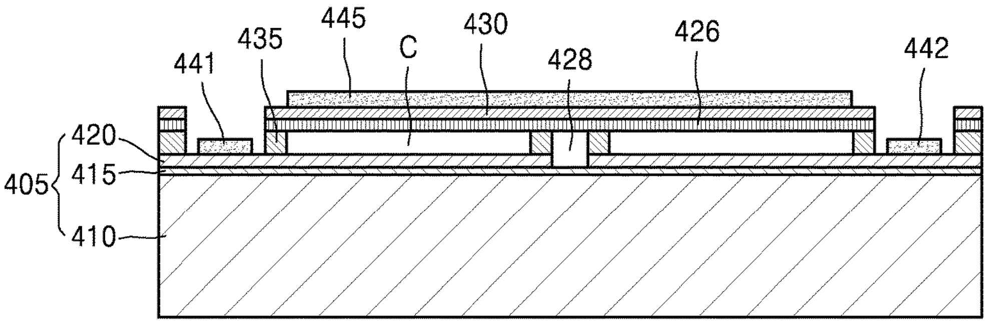

As shown in FIG. 19, the second substrate 433 and the third insulation layer 432 may be removed, and only the second thin film layer 430 may be left. A cavity C may be formed between the first thin film layer 420 and the fourth insulation layer 426. As shown in FIG. 20, the first thin film layer 430, the fourth insulation layer 426, and the second insulation layer 422 may be etched to form a second gap 434. Then, as illustrated in FIG. 21, an electrode layer 440 may be stacked on a resultant structure illustrated in FIG. 20. As shown in FIG. 22, the electrode layer 440 may be patterned to form an electrode pad on a portion of the first thin film layer 420 that is exposed via the second gap 434. For example, a first electrode pad 441 may be formed in an element, and a second electrode pad 442 may be formed in another element. The first and second electrode pads 441 and 442 may be signal electrode pads that apply driving signals to the elements. A common ground electrode 445 may be formed on the second thin film layer 430. The common ground electrode 445 may be used commonly by all of the elements. Since the common ground electrode 445 is formed on a top surface that contacts a body, the ultrasonic transducer may be safely used.

Moreover, in the ultrasonic transducer manufacturing method according to the present embodiment, since the first wafer 405 and the second wafer 434 may be directly bonded with each other, a manufacturing process may be simplified and manufacturing costs may be reduced.

Although the ultrasonic transducer and a method of manufacturing the same have been described with reference to the embodiments illustrated in the drawings in order to facilitate understanding of the embodiments, the illustrated embodiments are only examples, and various modifications to the illustrated embodiments and other equivalent embodiments may be possible.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An ultrasonic transducer comprising:

a substrate;

a first insulation layer formed on the substrate;

a first thin film layer provided on the first insulation layer and split into electrically independent elements by at least one insulation unit included in the first thin film layer;

a plurality of support members provided on the first thin film layer;

a second thin film layer supported by the plurality of support members;

a cavity provided between the first thin film layer and the second thin film layer;

at least one signal electrode pad included in each of the electrically independent elements and formed on the first thin film layer; and a common ground electrode on the second thin film layer.

2. The ultrasonic transducer of claim 1, wherein the substrate and the first thin film layer comprise silicon.

3. The ultrasonic transducer of claim 1, wherein the substrate, the first insulation layer, and the first thin film layer constitute a silicon-on-insulator (SOI) wafer.

4. The ultrasonic transducer of claim 1, wherein the first thin film layer is a thin film silicon layer.

5. The ultrasonic transducer of claim 1, wherein the first thin film layer has a thickness in the range of about 0 to about 10 μm.

6. The ultrasonic transducer of claim 1, wherein the first thin film layer is formed on the first insulation layer and contacts the first insulation layer.

7. The ultrasonic transducer of claim 1, further comprising a second insulation layer formed on the first thin film layer.

8. The ultrasonic transducer of claim 7, wherein a groove is formed in a portion of the second insulation layer that is adjacent to one of the plurality of support members.

9. The ultrasonic transducer of claim 1, further comprising a third insulation layer formed on a surface of the first thin film layer that faces the cavity.

10. The ultrasonic transducer of claim 1, wherein the insulation unit extends from the first thin film layer to a lower surface of the second thin film layer.

11. The ultrasonic transducer of claim 1, wherein the electrically independent elements are arranged one-dimensionally.

12. A method of manufacturing an ultrasonic transducer, the method comprising:

forming a first wafer comprising a first substrate, a first insulation layer, and a first thin film layer;

forming a second insulation layer on the first thin film layer by deposition;

forming a gap by etching the second insulation layer;

forming an insulation unit by etching the second insulation layer and the first thin film layer;

forming a second wafer comprising a second substrate, a third insulation layer, and a second thin film layer;

changing the gap into a cavity by disposing the second thin film layer of the second wafer on the second insulation layer;

removing the third insulation layer and the second substrate; and forming a common ground electrode on the second thin film layer.

13. The method of claim 12, wherein the first substrate, the second substrate , the first thin film layer, and the second thin film layer comprise silicon.

14. The method of claim 12, wherein the first wafer and the second wafer are SOI wafers.

15. The method of claim 12, wherein the first and second thin film layers are thin film silicon layers.

16. The method of claim 12, wherein the first thin film layer and the second thin film layer have thicknesses in the range of about 0 to about 10 μm.

17. The method of claim 12, wherein the first thin film layer is formed on the first insulation layer and contacts the first insulation layer.

18. The method of claim 12, further comprising forming a fourth insulation layer on the second insulation layer by deposition.

19. The method of claim 12, further comprising forming a fifth insulation layer on the second insulation layer by deposition.

20. The method of claim 12, wherein a plurality of elements arranged one-dimensionally are defined by the insulation unit.

* * * * *